May 7, 1968      J. M. LESTER      3,382,349

MAGNETO-MECHANICAL COUNTING DEVICE

Filed Feb. 10, 1965      3 Sheets-Sheet 1

INVENTOR.
JOHN M. LESTER
BY
John H. Gallagher
ATTORNEY

May 7, 1968  J. M. LESTER  3,382,349

MAGNETO-MECHANICAL COUNTING DEVICE

Filed Feb. 10, 1965  3 Sheets-Sheet 2

INVENTOR.
JOHN M. LESTER
BY
John H. Gallagher
ATTORNEY

May 7, 1968  J. M. LESTER  3,382,349
MAGNETO-MECHANICAL COUNTING DEVICE
Filed Feb. 10, 1965  3 Sheets-Sheet 3

INVENTOR.
JOHN M. LESTER
BY
John N. Gallagher
ATTORNEY

United States Patent Office 3,382,349
Patented May 7, 1968

3,382,349
MAGNETO-MECHANICAL COUNTING DEVICE
John M. Lester, Garden City, N.Y., assignor to Sperry Rand Corporation, Great Neck, N.Y., a corporation of Delaware
Filed Feb. 10, 1965, Ser. No. 431,616
7 Claims. (Cl. 235—92)

ABSTRACT OF THE DISCLOSURE

A magnetic flux pulse counter in which a ball of magnetic material, in response to successive magnetic flux pulses, is stepped circumferentially along a path formed by a pair of vertically spaced-apart races. Each complete revolution of the ball around the path is detected and an output signal produced.

---

This invention relates to small and economical counter or logic devices, and more particularly to such a device that operates in response to magnetic flux pulses to successively position a member of magnetic material along a predetermined path. The member of magnetic material makes one complete traversal of the path in response to a fixed number of magnetic flux pulses, and means are provided for producing an output signal at the conclusion of each traversal, thereby indicating that the device has accumulated a count equal to said fixed number of pulses.

A device constructed in accordance with the present invention is particularly useful in low cost counting or computing apparatus in which the speed of operation need not be high, and the device is intended for use in environmental conditions in which shock, vibration, and acceleration are at a minimum.

In accordance with one embodiment of the invention, the device is comprised of first and second annular sawtooth races which are disposed facing each other in vertical spaced-apart relationship. The races are made of a nonmagnetic material and a ball of magnetic material is positioned on the lower race and is adapted to move vertically between and circumferentially around the two races. The crowns on the respective teeth of the two sawtooth races are disposed intermediate each other and the teeth of the lower race have a sharp leading surface and a gradually declining trailing surface. The trailing surface of the teeth on the upper race are inclined gradually upwardly. A magnetic circuit is established for providing pulses of magnetic flux which attract the ball from the lower race to the upper race. When the ball comes into contact with the upper race it will be forced circumferentially along the gradually sloping trailing surface of a sawtooth and will come to rest against the leading surface of the next succeeding sawtooth on that race. At the termination of the magnetic flux pulse the ball falls due to gravity back to the lower race and rolls down the trailing surface of a sawtooth and comes to rest against the leading surface of the next succeeding sawtooth on the lower race. As the ball progresses circumferentially along a trailing surface of a sawtooth on the upper race it passes by the crown of a sawtooth on the lower race, and similarly when the ball moves along a trailing surface of a sawtooth on the lower race it passes circumferentially past the crown of a sawtooth on the upper race. In response to successive magnetic flux pulses the ball is stepped around the races in the manner just described and makes one complete revolution after a number of pulses that is equal to the number of sawteeth on the lower race. Means are provided for detecting when the ball is present at a given rest or dwell position on the lower race so that means now are available to produce an output signal each time the ball has made one revolution about the lower race. If the lower race has ten sawteeth on it, for example, one output signal will be produced by the device in response to each ten magnetic flux pulses.

The present invention will be described by referring to the accompanying drawings wherein.

Figure 4:
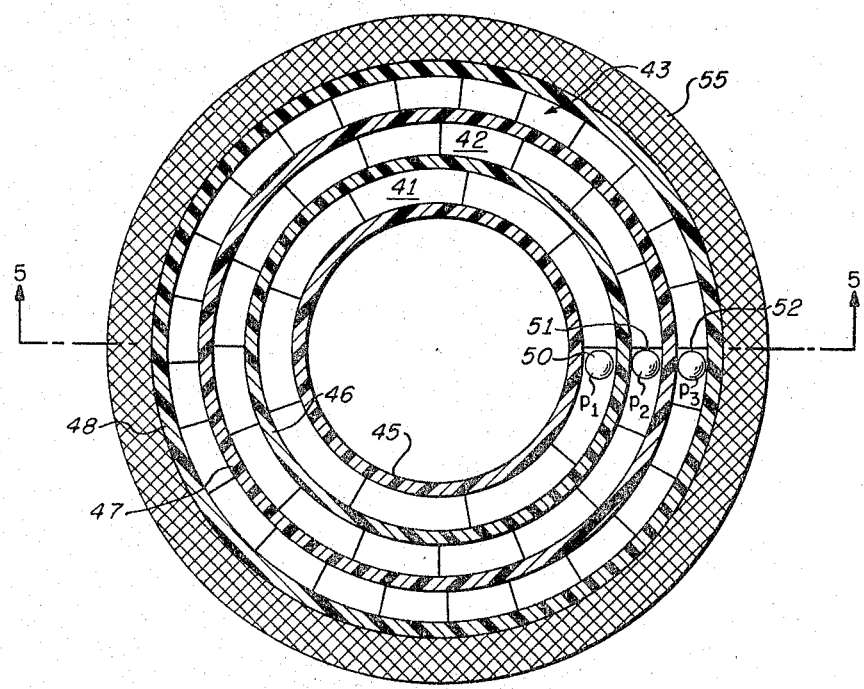
Figure 5:
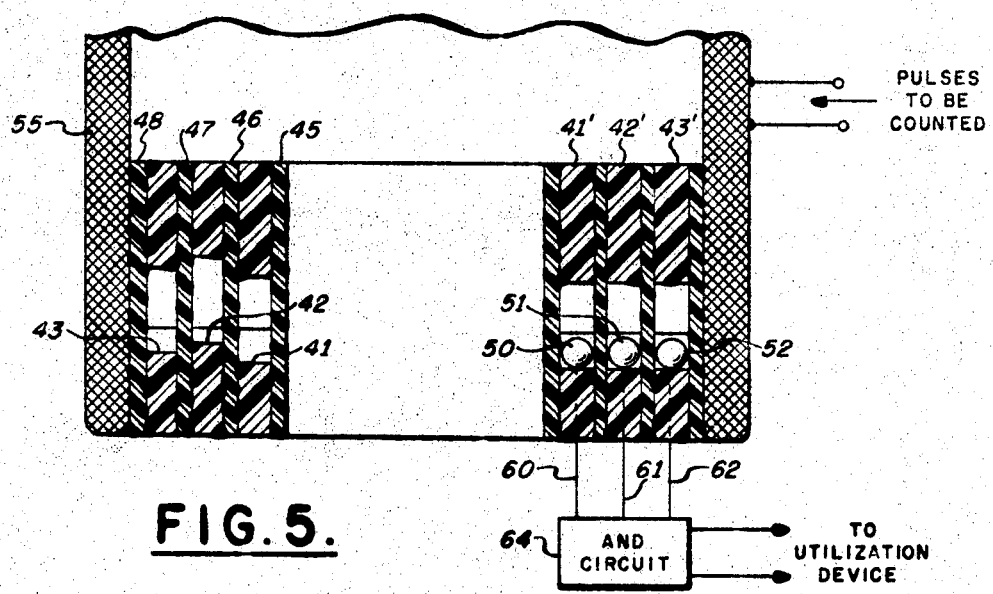
Figure 6:
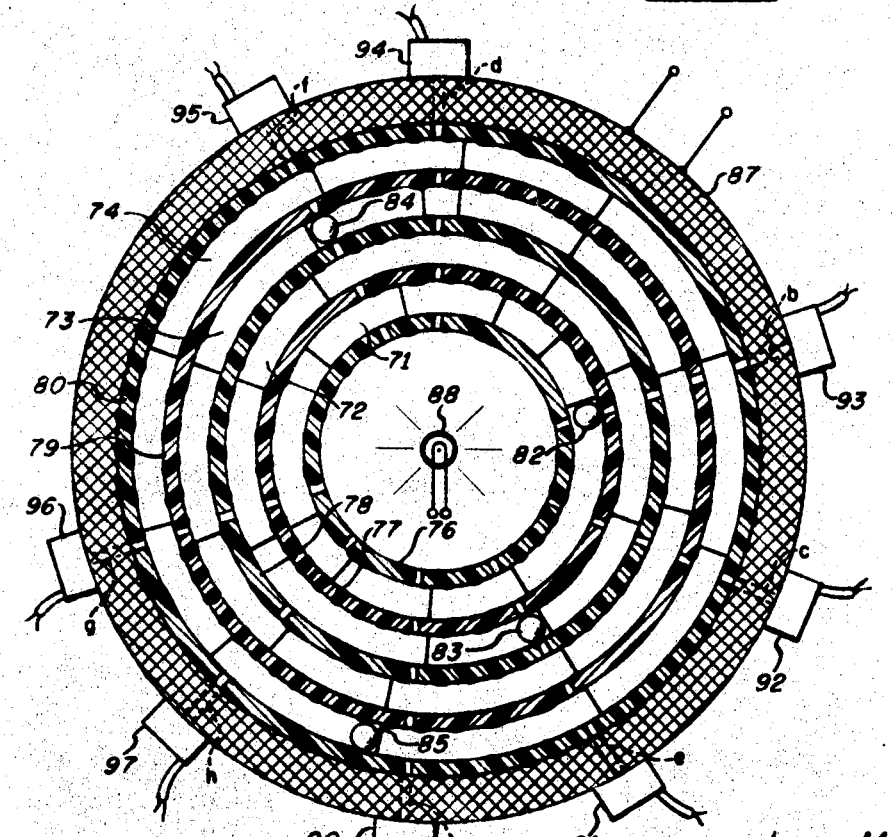

FIGS. 4 and 5 are respective horizontal and vertical sectional views of a device constructed in accordance with the teachings of this invention and which has the capability of counting by very large numbers; and FIG. 6 is a sectional view of the bottom races of an alternative embodiment of the present invention that operates as a digital counter and is capable of producing an output signal in accordance with a given code to indicate the count stored in the counter at any given time.

Figure 1:
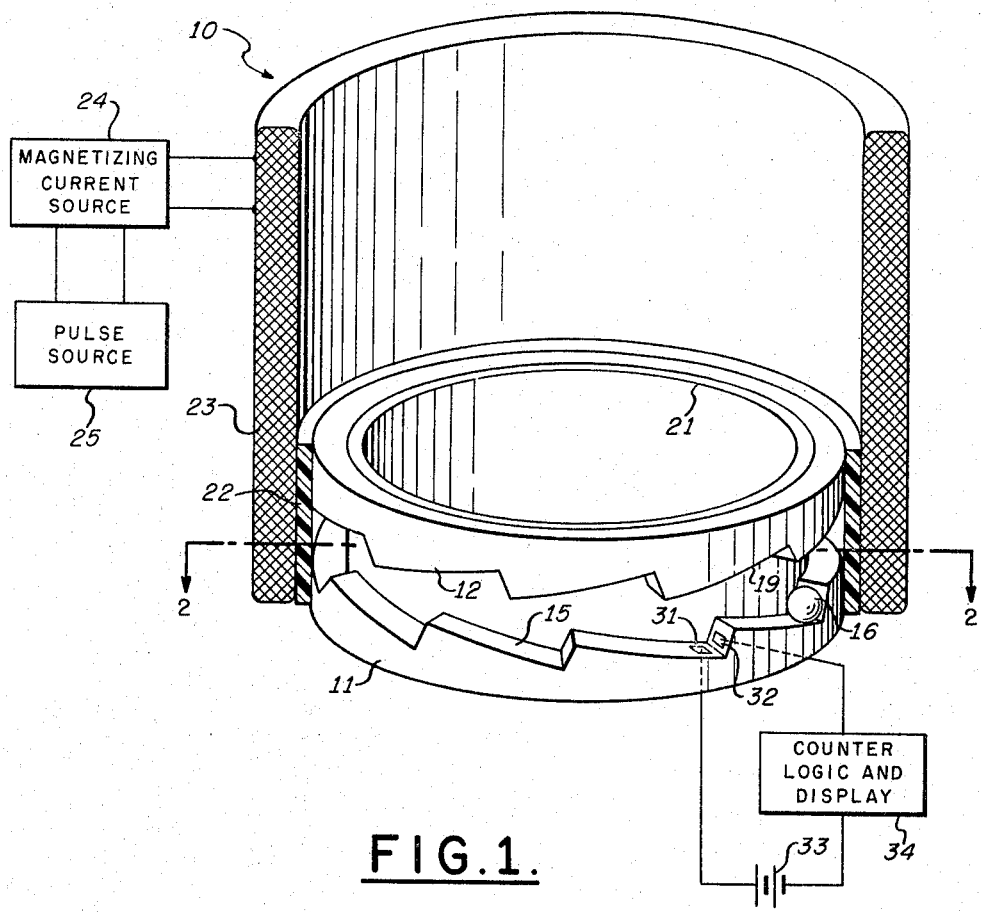
FIG. 1 is a perspective view, partially broken away, illustrating one embodiment of a decimal counter constructed in accordance with the present invention.
Figure 2:
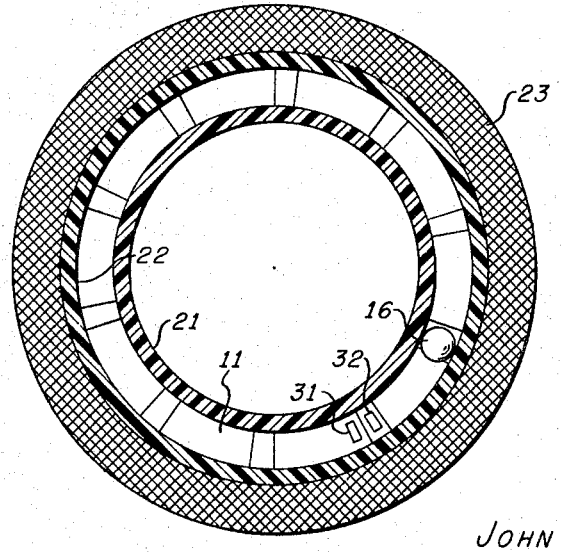
FIG. 2 is a sectional view of the device of FIG. 1 taken at section 2—2.

Referring now in detail to the drawings, the counter device 10 illustrated in FIGS. 1 and 2 is comprised of first and second annular members 11 and 12 of nonmagnetic material which are positioned vertically in spaced-apart relationship. Bottom annular member 11 has a sawtooth race or pathway 15 about its top edge around which the ball 16 of magnetic material may travel, as will be explained in more detail hereinbelow. Race 15 has ten teeth on it and each tooth has a steep leading surface on its left side and a more gradually sloping surface on its right side. The sawtooth race 15 may be considered as advancing counterclockwise around annular member 11, when viewed from above. Upper annular member 12 also has a sawtooth race 19 of ten teeth on its lower surface, but this race 19 differs from the bottom race 15 in that the leading and trailing surfaces of the sawteeth on race 19 are oppositely inclined with respect to those on bottom race 15. It may be seen that the crowns of the teeth on the upper race 19 are positioned intermediate the crowns of the teeth on the lower race 15. The reason for this angular displacement will become obvious from the description of the operation of the device which is set forth below. In practice, the annular members 11 and 12 may be made of nylon, Teflon, or some other similar type of plastic material.

In this illustrated embodiment of the invention, ball 16 must possess the properties of being both a good electrical conductor and having high magnetic permeability. Accordingly, ball 16 may be made of iron, steel, or a ferrite material which has a thin coating of an electrically conductive material.

Annular members 11 and 12 are maintained in their relative positions by the inner and outer cylindrical members 21 and 22 of a nonmagnetic material. Cylindrical members 21 and 22 also function to confine the ball 16 within the region between races 15 and 19.

Disposed about the outer cylindrical member 22 is the magnetizing solenoid 23 which when energized produces a vertically directed magnetic field in the regions occupied by annular members 11 and 12 so as to immerse the ball 16 in the field. Solenoid 23 is energized by a magnetizing current source 24 which produces pulses of magnetizing current in response to corresponding pulses that are to be counted, these pulses emanating from the pulse source 25. The magnetizing current pulses may be either alternating current or direct current pulses. If desired, high permeability magnetic material may be included in the device in a manner to provide a lower reluctance magnetic flux circuit. The pulses of magnetic flux produced by solenoid 23 are of sufficient magnitude and duration to cause the ball 16 to be deflected upwardly and into contact with the upper race 19 of annular member 12. Ball 16 will have a natural tendency to seek a null position midway between the ends of solenoid 23 when immersed in the magnetic field of the solenoid, so in order to assure that optimum lifting force is exerted on ball 16 by the magnetic field of the solenoid the races 15 and 19 should be located near an end of the solenoid rather than near the center region. As a general rule, the top annular member 12 should extend within solenoid 23 no further than one-third the length of the solenoid.

At one dwell position of ball 16 on lower race 15 means are provided for detecting the presence of ball 16. Various means could be used for this purpose, but the means illustrated in FIG. 1 is comprised of two electrically conductive surfaces 31 and 32 which are insulated from each other, thus providing an open circuit condition in the electrical circuit that includes the battery 33 and the counter logic and display means 34. When conductive ball 16 is located one dwell position to the left of that illustrated in FIG. 1, it will be in conductive contact with both conductive surfaces 31 and 32, thereby closing the electrical circuit to battery 33 and providing an indication to counter logic and display means 34 that ball 16 is in a given position on the counter. When operating as intended, ball 16 is in the position of the electrical contacts 31 and 32 after one complete revolution about the races 15 and 19, one complete revolution corresponding to a decimal count of ten, as will be explained.

The counter logic and display means 34 may be comprised of additional counter stages similar to the device 10, or may be comprised of other logical components, and may include means for presenting a visual display of the decimal count.

Figure 3A:
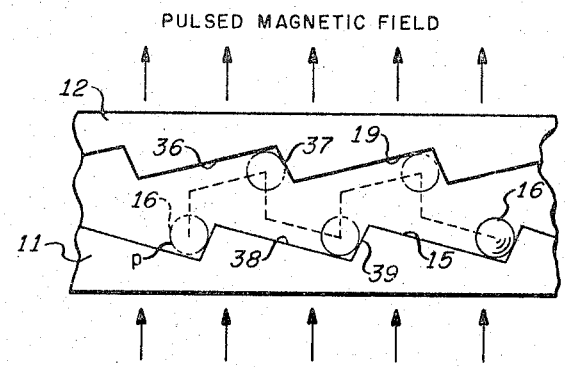
FIGS. 3a and 3b are simplified sketches used in explaining the operation of the device illustrated in FIGS. 1 and 2.
Figure 3B:
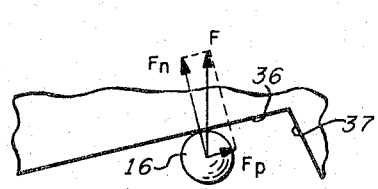

For a detailed description of the operation of the counter 10 of this invention, reference now will be made to FIG. 3a which is a simplified planar illustration of portions of the annular members 11 and 12, with the ball 16 of magnetic material positioned therebetween. In the absence of a magnetizing pulse being applied to solenoid 23 of FIG. 1, ball 16 will be at the dwell position $p$ at the left side of FIG. 3a. When solenoid 23 is energized and causes ball 16 to be immersed in the vertically directed magnetic field, ball 16 will be deflected upwardly and will strike the upwardly sloping surface 36 of upper race 19. As illustrated in FIG. 3b, the force F acting on ball 16 may be resolved into two components, one component $F_n$ directed normally to the sloping surface 36 and the other component $F_p$ directed parallel to the sloping surface 36. The force $F_p$ is of sufficient strength to cause ball 16 to roll up the sloping surface 36 until it is stopped by the downwardly sloping surface 37 of the next sawtooth on the upper race 19. With ball 16 in this position the energizing pulse in solenoid 23 is terminated and the magnetic field abruptly dies out, thus allowing ball 16 to fall due to gravity back onto lower race 15 where it rolls down the sloping surface 38 and comes to rest against the leading edge 39 of the next sawtooth on lower race 15. Successive magnetic flux pulses will cause ball 16 to advance circumferentially in a similar manner, always proceeding from the first race to an obstacle free region of the second race and then advancing circumferentially around the second race by a distance sufficient to clear the obstacle on the first race, after which the progress in the second race is impeded by an obstacle on that race. The ball then returns to the first race and advances circumferentially by a distance sufficient to clear the obstacle in the second race, after which the process may repeat itself.

It thus may be seen that it will take ten magnetic flux pulses to advance the ball 16 one revolution about the race 15, and by providing suitable detecting means, such as the conductive surfaces 31 and 32 of FIG. 1, for detecting when the ball 16 has made one revolution, the device 10 of FIG. 1 will function as a counter to produce an output signal for each ten pulses applied thereto.

The device illustrated in FIG. 1 can be made quite inexpensively in a small size in which the entire diameter is considerably less than 1 inch. The counter of FIG. 1 has the inherent advantage that it has a built-in memory since the position of ball 16 will not change should the equipment be subject to a momentary power failure, for example. A further advantage of the device of this invention is that the ball and races may be completely sealed against the outside atmosphere. Additionally, when electrical contacts such as the contacts 31 and 32 of FIG. 1 are used, an inert gas may be sealed within the ball and races so as to minimize the possibility that the contacts will corrode. The device of this invention is intended for use in comparatively slower operating apparatus that is to be used in environments where the equipment will not be subjected to excessive shock, vibration, or acceleration. The counter of this invention is well suited for use in such devices as desk calculators and permanently located electronic clocks, for example.

It is believed obvious to those skilled in the art that the device of this invention is not restricted to the precise type of sawtooth races illustrated in the accompanying drawings. Other irregularly shaped races may be employed so long as they contain both the obstacles and the obstacle-free regions about which the ball may advance, the obstacles of the two races being disposed intermediate each other so that the position and the movement of the ball may be controlled in a step-like manner. As a suggestion for an alternative configuration for the upper and lower races of the counter device, each race may be a succession of ten scallops wherein the scalloped portions of one race are positioned intermediate to those of the other race.

In the device described in FIGS. 1 and 2, a single ball travelled around a single pair of races. If such a device is to count by large numbers, the diameter of the races would have to be increased in order to accommodate a great many more teeth. This increased diameter may increase the complexity and decrease the efficiency of the magnetic circuit for stepping the ball around the races, and further may obviate one of the advantages of the present device, this being the small size in which it can be made. A device for counting by very large numbers may be constructed in accordance with the teaching of this invention by providing a plurality of pairs of races around which a corresponding plurality of balls may travel. The races of the different pairs have different numbers of teeth on them and if the balls start at given positions in the respective pairs of races, then they all will again be in the same given positions at the same time only after a total count has transpired that is equal to the product of the number of teeth on one race from each pair, that is, $c = t_1 \times t_2 \times t_3 \times \ldots t_n$ where $c$ is the total count and $t_1 \ldots t_n$ are the number of teeth on one race of each pair of different races, and where the numbers $t_1 \ldots t_n$ are relatively prime numbers, that is, none of the numbers have a common denominator. Thus by providing means for detecting when all of the balls are in their given positions at the same time the counter may count by multiples of $c$.

A device of the type just described is illustrated in simplified form in FIGS. 4 and 5. The device is comprised of three annular concentric lower sawtooth races 41, 42 and 43, all of which are formed from nonmagnetic material and which are bound by the concentric cylinders 45, 46, 47 and 48 of nonmagnetic material. The cylinders 45–48 confine the balls 50, 51 and 52 of magnetic material within the respective circular raceways between the lower annular members 41, 42, 43, and upper annular members 41′, 42′ and 43′. The upper annular members 41′, 42′, and 43′ each has a sawtooth race about its bottom surface which corresponds to the race 19 of the device illustrated in FIG. 1. In FIG. 4, the short radial lines spaced about each of the races 41, 42 and 43 are intended to represent the crowns of the sawteeth that are distributed about the races. It may be seen that the races 41, 42 and 43 have different numbers of sawteeth on them. For example, the innermost race 41 is illustrated as having 9 sawteeth uniformly distributed about the race, the center race 42 has 16 sawteeth uniformly distributed around it, and the outermost race 43 is illustrated as having 25 teeth uniformly distributed around it. The upper race associated with each of the illustrated lower races of FIG. 4 will have a corresponding number of sawteeth and the lower and upper race of each pair will be shaped and arranged in the same manner as the lower and upper races of the device of FIG. 1.

A magnetizing solenoid 55 is positioned around the outermost cylindrical member 48 and when energized by current pulses that are to be counted provides the means for establishing a vertically directed magnetic field that immerses the races and the balls therein and cause the balls 50, 51 and 52 to step around the respective races in the same manner as discussed in connection with the description of FIGS. 1 and 2. The balls of magnetic material 50, 51 and 52 have an electrically conductive coating and electrical contacts are located at the dwell positions $p_1$, $p_2$ and $p_3$, FIG. 4, so that when the balls are at these three positions at the same time electrical signals will be coupled over the respective lines 60, 61 and 62, FIG. 5, to an AND gate 64 which operates to pass an electrical signal to a utilization means, thus indicating that the balls 50, 51, and 52 are present at the same time at the given positions $p_1$, $p_2$ and $p_3$.

In the operation of the device illustrated in FIGS. 4 and 5, successively occurring pulses to be counted are coupled to solenoid 55 and produce successively occurring magnetic flux pulses which cause each of the balls 50, 51 and 52 to progress in step-by-step manner around the respective races 41, 42 and 43. Because each of the concentric races 41, 42 and 43 has a different number of teeth on it, each ball will make one complete revolution around its respective race in a number of counts that is different from the counts required for the other balls. Therefore, the three balls will not again be aligned in the same positions illustrated in FIG. 4 until a total count has been accumulated which is equal to the product of the number of teeth on each of the lower races 41, 42 and 43. In the example illustrated, the total count accumulated before an output signal is produced from AND circuit 64 will be 3600, this being the product of $9 \times 16 \times 25$.

It now may be seen that by employing a plurality of pairs of races a device constructed in a manner illustrated in FIGS. 4 and 5 is capable of accumulating exceedingly large counts without requiring that the size of the device become excessive.

Devices operating according to the principles of this invention may perform still other types of counting and logical operations. The device that is illustrated in simplified form in FIG. 6 is an example of a decimal counter which counts in accordance with a given code and provides coded output signals that represent the numerical count that is stored in the device at any given time. The device is comprised of four pairs of concentric sawtooth races that are arranged generally in the same manner as the concentric pairs of races illustrated in FIGS. 4 and 5. For simplicity of illustration, only the four bottom races and the four respective balls are shown in the horizontal sectional view of FIG. 6 since it is believed that the following explanation will suffice to clearly describe the construction and operation of the device. As illustrated in FIG. 6, the four bottom sawtooth races 71, 72, 73 and 74, all of which are formed on annular members of nonmagnetic material, are disposed concentrically with respect to each other and are bounded by the five nonmagnetic cylindrical members 76, 77, 78, 79 and 80. The radially-extending lines of each of the races 71-74 represent crowns of the sawteeth on the races. Balls of magnetic material 82, 83, 84 and 85 are respectively disposed in the races 71-74 and in their rest or dwell positions will be located against a sharply-inclined leading edge of a sawtooth, in the same manner as illustrated in FIG. 1.

A solenoid 87 is positioned about the outermost cylindrical member 80 and in response to magnetizing current pulses that are to be counted produces pulses of magnetic flux that cause each of the balls 82-85 to be deflected against its respective upper race and thereby progress about its respective raceway in the step-like manner previously described.

Each of the races 71-74 has ten teeth on it but the teeth are not uniformly spaced on any one race, nor are the teeth on any two of the races spaced exactly the same. The non-uniform spacings of the teeth on each of the races are for the purpose of establishing a particular decimal code. The presence or absence of the balls 82-88 at the azimuthal positions designated $a$ through $h$ establishes the code in accordance with the following table in which an $x$ in an azimuthal position indicates the presence of a ball at that position.

| | | | | Decimal Number | | | | | | |
|---|---|---|---|---|---|---|---|---|---|---|
| | 1 | 2 | 3 | 4 | 5 | 6 | 7 | 8 | 9 | 0 |
| Azimuth Position: | | | | | | | | | | |
| a | | | | | X | X | | | | |
| b | X | | | X | | | | | | |
| c | | X | X | | | | | | | |
| d | | | | | | | | | | X |
| e | | | | X | X | X | | | X | |
| f | | | | | X | | | | | |
| g | | X | | | | | | | | |
| h | X | | | | | | X | | | |

In the device illustrated in FIG. 6, the presence of the balls at any of the given azimuthal positions $a$ through $h$ is detected by means of the interruption of light beams that are directed radially along the azimuthal positions. To accomplish this purpose a light source 88 is located centrally within the device and respective radially-extending light passages are provided at the azimuthal positions $a$ through $h$ by means of light transparent apertures in the otherwise opaque cylindrical members 76-80. These light passages are vertically located so that the light beams pass through the regions occupied by the balls 82-85 when they are in the dwell positions that are coincident with the radial positions $a$ through $h$. For example, the balls 82, 83 and 84 are shown in dwell positions which would cause them to interrupt radial light beams at the azimuthal positions $b$, $e$ and $f$, respectively. The ball 85 is in a dwell position at which it does not interrupt any of the radially-directed light beams. Photoconductors 90, 91, 92, 93, 94, 95, 96 and 97 are disposed about outer surface of the device at each of the azimuthal positions $a$ through $h$ and are normally energized by the light beams from source 88 but are de-energized when one of the balls 82-85 intercepts a respective light beam. The electrical outputs from the photoconductors 90-97 may be coupled to a utilization device which is not illustrated.

A comparison between the illustrated positions of the four balls 82-85 and the code set forth in the above code table will show that the counting device of FIG. 6 is storing a count of four since the photoconductors 90, 93 and 95 will have no electrical output signals therefrom inasmuch as the balls 82, 83 and 84 are blocking the respective light passages along azimuthal positions $b$, $e$ and $f$.

Each of the four balls will be stepped around its respective race one tooth at a time in response to each successive flux pulse that is produced by solenoid 87. Because each of the races 71-74 has ten teeth on it, each of the balls 82-85 will make one complete revolution about its respective raceway after each ten pulses of magnetic flux. By continuously monitoring the condition of the photoconductors 90-97 it is possible to determine the count that is stored in the counter at any time.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A magneto-mechanical ring counter device comprising,
a first annular race for the passage of a spherical member thereabout,
said race having a plurality of spaced obstacles therein that block the movement of a spherical member,
a second annular race for the passage of a spherical member thereabout,
said second race also having spaced obstacles therein,
said two races being positioned adjacent each other with the obstacles of one being located intermediate the obstacles of the other and the races being oriented relative to each other to permit a spherical member to pass from one race to the other,
a spherical member of magnetic material disposed between said races for movement thereabout,
means for producing a magnetic field in a given direction in the region occupied by said races to transfer said spherical member from said first race to said second race, and
means for advancing said spherical member circumferentially about said second race by a distance sufficient to avoid one obstacle in said first race each time said spherical member is transferred to said second race.

2. The combination claimed in claim 1 wherein the means for advancing the spherical member circumferentially about the second race is a plurality of surfaces that are obliquely inclined with respect to the direction of said magnetic field.

3. A magneto-mechanical counting device comprising,
a first closed race comprised of a plurality of inclined surfaces extending along said race and separated by transversely extending obstacles,
a second closed race comprised of a plurality of inclined surfaces extending along said second race and separated by transversely extending obstacles,
said races being disposed adjacent each other in a manner to afford access between the inclined surfaces of the two races,
the respective inclined surfaces of said two races being oppositely inclined with respect to each other,
a member of magnetic material disposed between said races and movable along the inclined surfaces of both of said races,
means for establishing a magnetic field in the region of said races to deflect said member of magnetic material from an inclined surface of one of said races to an inclined surface of the other race,
the obstacles of one of said races being positioned relative to the inclined surfaces of the other race to assure that said magnetic member moves circumferentially and avoids an obstacle in said one race after it has transferred to the inclined surface on the other race, and
means for determining when said magnetic member is in a given position on one of said races.

4. A counting device comprising,
a first plurality of $n$ races in which each race is comprised of a plurality of inclined surfaces extending along the respective race and separated by transversely-extending obstacles, $n$ being an integer,
a second plurality of $n$ races in which each race is comprised of a plurality of inclined surfaces extending along a respective race and separated by transversely-extending obstacles,
said first and second pluralities of races being disposed in adjacent spaced-apart relationship to form $n$ pairs of races about which $n$ respective movable objects may travel,
the obstacles on one race of each pair being positioned intermediate the obstacles on the other race of that pair and the inclined surfaces on the respective two races of a pair being oppositely inclined with respect to each other,
a movable member of magnetic material disposed between the races of each respective pair of races and adapted to move on command from one race to the other race of its respective pair and adapted to move along an obstacle free region of either of said races, and
means for establishing a magnetic field in the region of said races to deflect said members of magnetic material from the first plurality of races to said second plurality of races.

5. The combination claimed in claim 4 wherein the first plurality of $n$ races all have different numbers of inclined surfaces thereon.

6. The combination claimed in claim 4 wherein the inclined surfaces on each of the $n$ races of said first plurality of races are disposed non-uniformly throughout the respective races.

7. The combination claimed in 4 and further including,
means for detecting the presence of said $n$ members of magnetic material at respective given positions between their respective pairs of races.

References Cited

UNITED STATES PATENTS 3,127,686   4/1964   Goldfarb _____ 235—68 X

MAYNARD R. WILBUR, *Primary Examiner.*

G. J. MAIER, *Assistant Examiner.*